No. 831,139. PATENTED SEPT. 18, 1906.
W. T. BONNER.
GAGE FITTING.
APPLICATION FILED JULY 22, 1903.
2 SHEETS—SHEET 1.
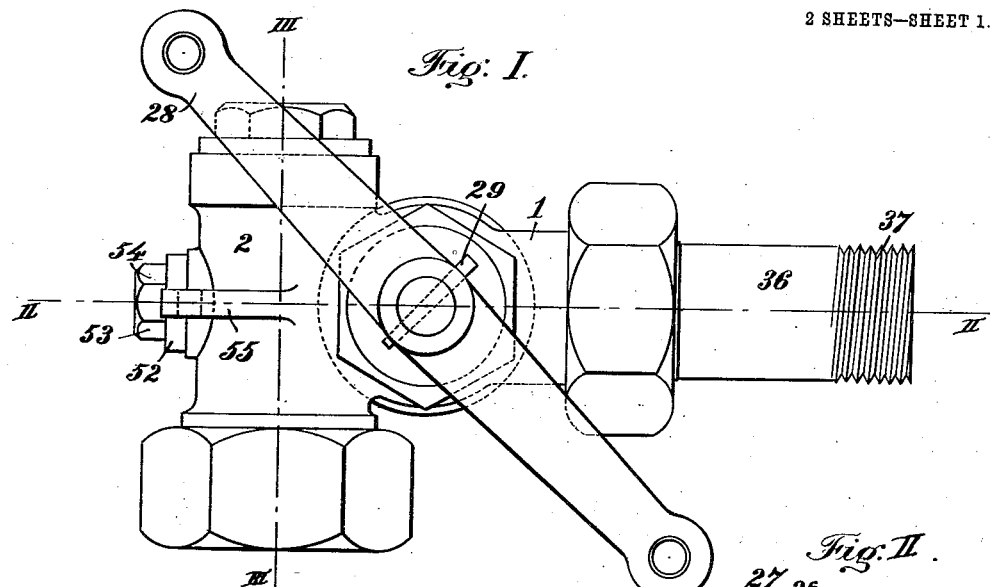
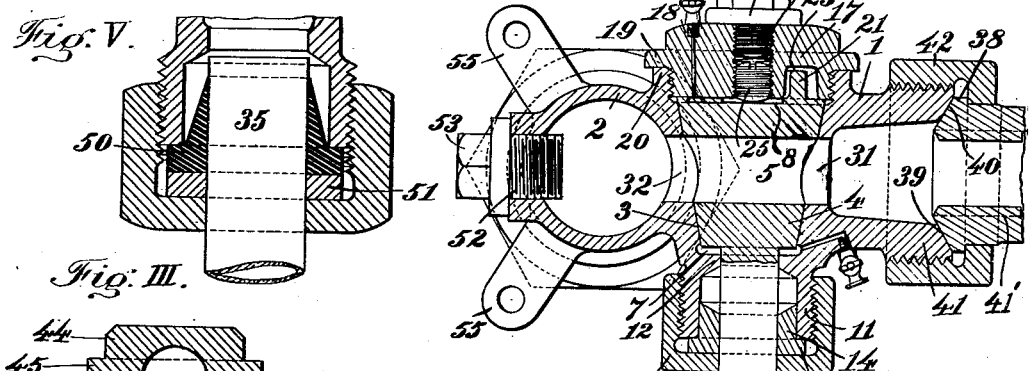
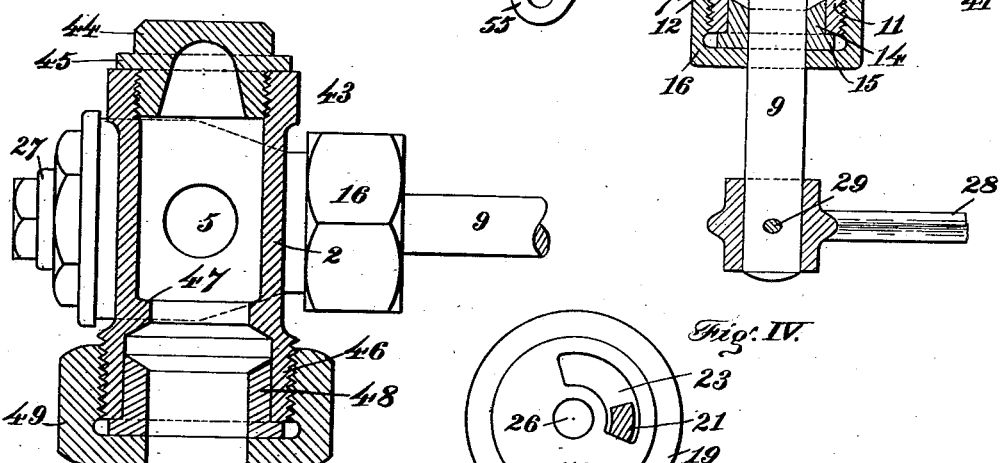
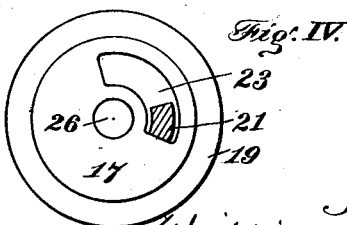
Witnesses:
Frank J. Kent.
Wm. B. Cregg Jr.
Inventor:
William T. Bonner
By Joseph W. Atkin
Attorney.

No. 831,139. PATENTED SEPT. 18, 1906.
W. T. BONNER.
GAGE FITTING.
APPLICATION FILED JULY 22, 1903.
2 SHEETS—SHEET 2.
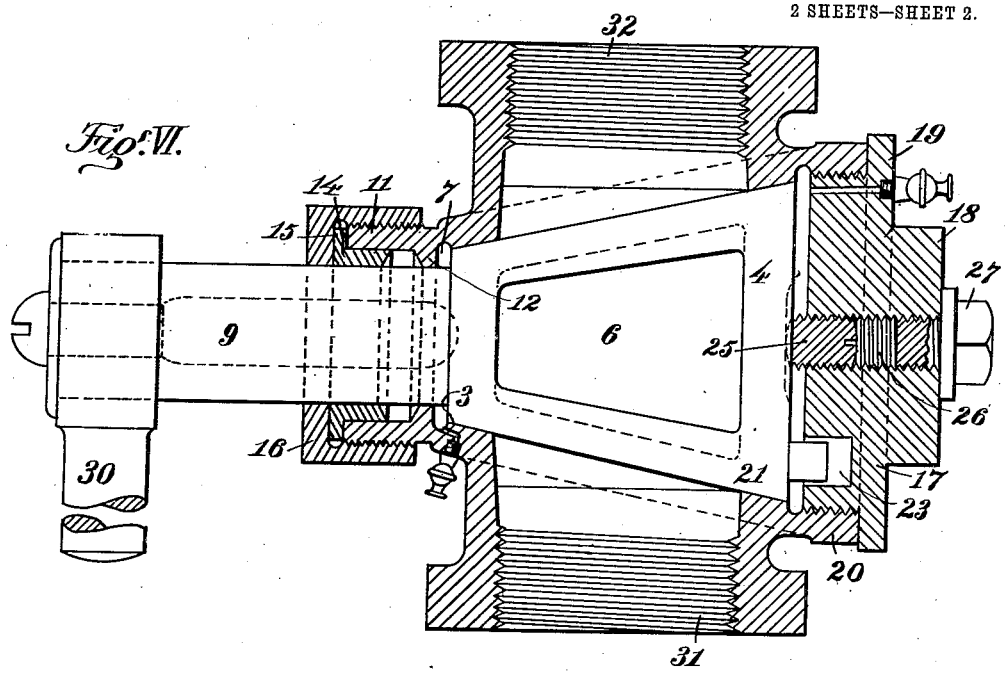
Fig. VI.
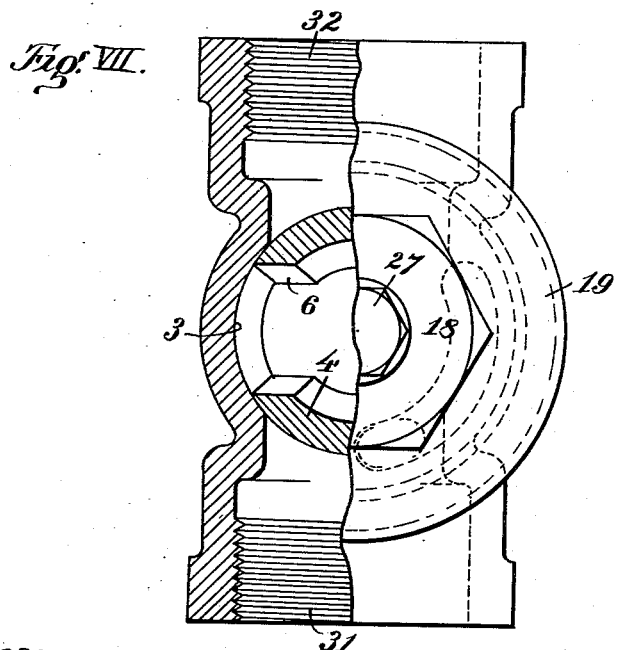
Fig. VII.
Witnesses:
Frank J. Kent.
Wm B. Gregg Jr
Inventor:
William T. Bonner,
By Joseph F. Atkin.
Attorney.

UNITED STATES PATENT OFFICE.

WILLIAM T. BONNER, OF BOSTON, MASSACHUSETTS, ASSIGNOR TO THE WM. T. BONNER CO., A CORPORATION OF MASSACHUSETTS.

GAGE-FITTING.

No. 831,139.  Specification of Letters Patent.  Patented Sept. 18, 1906.

Application filed July 22, 1903. Serial No. 166,607.

*To all whom it may concern:*

Be it known that I, WILLIAM T. BONNER, of Boston, in the county of Suffolk, State of Massachusetts, have invented certain new and useful Improvements in Gage-Fittings, of which the following is a complete specification, reference being had to the accompanying drawings.

My invention relates to improvements in fittings for steam-gages, and has for its object specifically the production of a fitting belonging to the class specified and particularly adapted thereto.

In the accompanying drawings, Figure I is a side elevation of one form of embodiment of my invention looking toward the plug-stem and operating-lever and showing all details complete in their preferred forms of embodiment respectively. Fig. II is a horizontal plan section on the line II II of Fig. I, some of the parts being shown in elevation. Fig. III is a section on the line III III of Fig. I, the plug-stem being broken away and its lever omitted. Fig. IV is a view of the inner face of the valve-cap detached, showing the stop-plug in section, as if assembled therewith. Fig. V is a sectional view similar to a portion of Fig. III intended only to show a modified form of gland. Fig. VI is a view similar to Fig. II, but showing the shell of a simple straightway cock and showing the plug thereof in elevation. Fig. VII is a view of the subject-matter of Fig. VI, partly in elevation and partly in longitudinal section, looking toward the plug-cap.

Referring to the numerals on the drawings, 1 in Figs. I and II represents the horizontal member of a steam-gage fitting, and 2 the vertical member thereof, which are preferably incorporated in a single casting or integral structure. The member 1, however, in that preferred form of embodiment of my invention illustrated in Figs. I and II is also functionally distinguished as a valve-shell or plug-case, being clearly bored out or otherwise fashioned to produce a snugly-fitting barrel 3 (shown with especial clearness in Figs. VI and VII) for the accommodation of a truncately conical plug 4, provided with a transverse port 5 of cylindrical form, as shown in Fig. II, or a port 6 of trapezoidal form, as shown in Fig. VI. The bore of the barrel 3 is provided at its narrower end with a steam-chamber 7 and at its broader end with a steam-chamber 8.

9 indicates a plug-stem which is united coaxially with the plug 4 at its upper or narrower end. This mode of uniting the plug and plug-stem I regard as an important feature of my invention and as one from which both directly and indirectly are derived important advantages. A partial enumeration of such advantages may include in the first instance a single stuffing-box about the stem, which may be made of comparatively small dimensions, simple in construction, and efficient in operation. For example, the barrel 3 may be provided at its narrower end with an externally-threaded cylinder or box proper, 11, projecting beyond an internal annular projection 12, which hugs the stem 9 and constitutes the bottom of the bore of the box. Into said bore fits a gland 14, preferably provided with an external annular flange 15, which is held in place by an annular screw-cap 16, internally threaded to fit the box 11. In practice, of course, suitable packing material is confined within the bore of the box between the gland 14 and the annular projection 12.

By uniting the stem 9 to the upper end of the plug 4 it is made practicable to simply cap the broader end of the barrel 3, which may be effectually accomplished without liability of leakage, as by the employment of an externally-threaded cap 17, having a head 18, provided with wrench-flats and a projecting intermediate annular flange 19. The threaded cap screws into the internally-threaded cylindrical projection 20 of the barrel.

As a means of limiting the rotative movement of the plug 4 I prefer to employ limiting mechanism consisting, preferably, by reason of its simplicity and practicability of construction, of a lug 21, projecting from the base of the plug and working in a segmental groove 23 in the cap 17. The lug 21 not only does not interfere with the use of any ordinary mode of grinding the plug into its barrel, but by dogging the cap through which it may be turned back and forth assists therein.

Another distinct advantage in conjoining the stem 9 with the narrower end of the plug 4 and the provision consequently made for the use of the simple cap 17 for closing the broader end of the barrel is that means is afforded not only for the convenient adjustment of the fit of the plug within its barrel, but of making such adjustment at any time while steam is on and from the outside of the assembled valve structure. To accomplish this novel and useful result, I provide in the cap 17 an abutment-screw 25, which being countersunk deeply within its screw-hole 26 is covered and the screw-hole is effectually closed by cap-plug 27. It will be obvious to one skilled in the art that the plug 4 may be tightened or loosened in its barrel by simply removing the cap-plug 27 and turning the screw 25 in one direction or the other. Thereupon by replacing the cap-plug 27 the screw-hole 26 may be effectually closed and all tendency toward leakage in that quarter prevented.

28 indicates a double-headed lever secured to the stem, as by a pin 29, by which the stem and the plug 4 attached thereto may be operated. It appears to be in order here to state that through the employment of the steam-chambers 7 and 8 at opposite ends of the barrel 3 and the leakage of steam in practice between the engaging faces of the barrel and its plug into said chambers seating pressure of the plug within the barrel is effectually regulated, so that it may be operated by comparatively small power. For that reason the lever 28 may be made comparatively short or a single-arm short lever 30, as shown in Fig. VI, may be employed.

It should be observed that pressure against the tapered end of the plug tends to lift the plug from its seat and pressure in the opposite direction tends to seat it. The pressure in the chamber 8 constitutes, therefore, the seating pressure and pressure upon the tapered side of the plug and in the chamber 7 resists the seating pressure. Except for the presence of the stem 9 on the tapered end of the plug the fluid-pressure upon the opposite sides of the plug would in full operation counterbalance each other. The presence of the stem, however, leaves a preponderance of seating pressure, which, while it may suffice to perfectly seat the plug, may be reduced to such a limit as to render the turning of the stem and its plug attached an easy matter, requiring the exertion of but little power. If the pressure were immediately and directly with the opening of the plug transmitted to the chambers 7 and 8, respectively, the seating pressure of the plug while steam were on would remain constant at full boiler-pressure. Consequently there would be a constant liability of the plug to stick in its barrel. In my device, on the contrary, an important difference in result is obtained for two reasons: first, that leakage between the closely-fitting faces of the plug and its barrel can alone enter the chambers 7 and 8 and there exert a pressure reduced below the high boiler-pressure, to control which my invention is especially designed; second, that when steam enters the valve the first effect of the pressure on the inlet side is to lift the plug from its seat, like a puppet-valve, whereupon the steam rushing into the chambers 7 and 8 instantly seats the plug with a regulated pressure, as hereinbefore specified. The function of the screw 25 is simply to limit the puppet action of the valve and not to prohibit it. The shell or case 1 is provided with ports—as, for example, the ports 31 and 32—communicating, respectively, with the bore 5 or 6 of the plug 4, whichever form of bore be employed therein.

Having hereinbefore specified the plug and its shell in their more generic scope, I shall now refer to the more specific form of embodiment of my invention in its special application to a gage-fitting.

In that form of embodiment the shell 1 is, as has been specified, preferably made integral with the vertical member 2 of such a fitting. Now in practice it is necessary to bring the vertical member into coaxial alinement with a gage or gage-supporting member corresponding to the member 2. It is difficult by the aid of threaded connections to secure the accuracy of adjustment necessary to such alinement, and it is especially difficult to secure the same in adjustment to a gage-glass 35 (indicated in Fig. V of the drawings) particularly without excessive abbreviation of the gage. For that reason I prefer to employ in connection with my gage-fitting a nipple 36, having at one end a threaded extremity 37 and at the other an annular flange 38 and a conical face 39. The face 39 fits accurately, as by a ground joint, against the inversely-conical face 40 of the threaded end 41 of the shell 1.

42 indicates an internally-threaded annular connection which, screwing upon the threaded end 41 and engaging the annular projection 38, confines the faces 39 and 40 into steam-tight contact.

It is obvious that through the employment of the connection last described it is entirely practicable after having once adjusted the nipple 36 to disconnect and reconnect the shell 1 thereto with accuracy and facility as often as occasion may require.

In order to provide for the screwing of the nipple 36 into position and its adjustment accurately to place in position without bruising in the least the face of the flange 38, I provide, as shown in Fig. 2, one or more wrench-lugs upon the inner bore of the nipple, which enables a wrench of proper contour inserted into said bore to catch and hold the nipple for turning it in either direction. Two lugs are shown in Fig. 2 and are indicated by the reference-numeral 41'.

In order to facilitate the adjustment of any gage which may be used into the member 2, I not only provide a stuffing-box at its lower end for securing the gage to the member 2 by a steam-tight joint, but I provide at the end of the member 2 opposite said stuffing-box a cap 43, threaded into the bore of the member 2 and preferably provided with a flatted head 44 and an intermediate annular flange 45. In the use of the cap 43 provision is made for keeping the member 2 conveniently closed by a steam-tight joint and also through its removal for adjusting a gage of any suitable length to the stuffing-box. The stuffing-box may be substantially such as has been already described, comprising, for example, an externally-threaded cylindrical box proper, 46, whose bore is provided with an annular bottom 47. Within the bore fits a gland 48, secured in place by an annular screw-cap 49, the bores of the gland and screw-cap, respectively, being of a size to correspond with the size of the gage-glass 35.

In place of packing of the ordinary form gasket 50 of comparatively soft material surmounted by a compression-ring 51, as shown in Fig. V, may be employed, the remaining members of the stuffing-box being substantially the same as those already specified.

The members 1 and 2 being located at right angles to each other, I provide in the wall of the member 2 opposite to and coaxial with the bore of the member 1 a screw-plug 52, threaded to an aperture provided for it and preferably provided with the usual flatted head 53 and annular flange 54. The plug 52 is intended to keep the bore of the member 2 normally closed, but to provide for its opening whenever required for dislodging any obstruction which might possibly occur in the ports 32, 5, or 31 or in the gage itself. It may be observed, however, that the construction of my fitting and valve provides for ports of comparatively the largest size, thereby permitting free circulation and discharge. (Compare Figs. I and II.)

55 indicates guard-rod supports which may be used to carry the usual guard-rods if my fitting be used with an ordinary gage-glass.

It is believed that the description of the mode of practical application of my device and its operation will be made clear from the foregoing specification to one skilled in the art, but a few advantages may be mentioned as being derivable from the novel features which characterize my invention in addition to those already specified. Proceeding accordingly, it is pointed out that the arrangement of the valve-body and plug permits either heavy or light construction, according to the pressure to be carried. The wide angle of the taper of the plug permits ample adjustment or grinding to overcome wear with very slight endwise movement of the plug.

The plug is held primarily to its seat by an adjustable set-screw, whose single bearing-point reduces friction to a minimum, but whose support of the plug is supplemented in use by the elastic pressure of the steam or other fluid which leaks into the chambers when the pressure is on.

The chambers 7 and 8 are preferably provided, respectively, for relief of pressure within the same, with petcocks 56 and 57, which are employed to release the plug for immediate operation when the steam-supply is shut off from the plug, the consequence of such shutting off of steam being that the excess of pressure in the chamber 8 under such conditions and without relief jams the plug into its barrel.

My valve is not only absolutely proof against leakage at high pressure and comparatively free from friction, due to the absence of packing members having large superficial areas, the only packing employed being that used around the stem, as has been specified, but its cost of maintenance is for the same reason reduced, and the tendency of the plug to bind, wedge, or twist is eliminated through the use of means of adjustment—to wit, the set-screw 25, located coaxially with the plug.

The working parts of my device are all accessible for examination, adjustment, or repair while the cock is in service. It should be noted that when the cock is open all its bearing-surfaces are protected from corrosion, the passage of the fluid controlled by the cock being made freely through its port. When the valve is closed, only a small portion of the bearing-surfaces of the plug is exposed to the corrosive influence of the controlled fluid, and any scale which might form on such exposed surfaces is ground off by the sharp edge of the barrel-ports when the plug is turned.

My fittings are applicable to all the various kinds of gages employed in practice, and they are interchangeable, the upper for the lower part, and vice versa. Besides, the lower fitting is provided with means for supporting the gage-glass, so that its lower end may not slip beyond the top of the port 32. Such means may consist simply of an inward elongation of the screw-plug 52, as shown in dotted lines in Fig. II.

The fitting proper has its advantages, exclusive of my preferred form of valve, on account of the readiness of adjustment of and accessibility to the gage, and may therefore be employed in connection with other forms of valve or without any valve whatever.

What I claim is—

In a gage-fitting the combination with a horizontal member and a vertical gage-supporting member provided with means for securing it to a gage-glass, of a coaxial aperture in the gage-supporting member opposite the other member, and an elongated screw-plug threaded within said aperture and extending into the bore of the gage-supporting member for supporting the gage-glass substantially as and for the purpose specified.

In testimony of all which I have hereunto subscribed my name.

WILLIAM T. BONNER.

Witnesses:
 A. L. HOUGH,
 JOSEPH L. ATKINS.